United States Patent
Gonguet et al.

(10) Patent No.: US 7,756,960 B2
(45) Date of Patent: Jul. 13, 2010

(54) USE OF A COMMUNICATIONS NETWORK ELEMENT MANAGEMENT SYSTEM TO MANAGE NETWORK POLICY RULES

(75) Inventors: Arnaud Gonguet, Paris (FR); Maurice Edwiges, St Pierre du Perray (FR); Julien Robinson, Paris (FR)

(73) Assignee: Alcatel, Paris (FR)

( * ) Notice: Subject to any disclaimer, the term of this patent is extended or adjusted under 35 U.S.C. 154(b) by 1219 days.

(21) Appl. No.: 10/884,972

(22) Filed: Jul. 7, 2004

(65) Prior Publication Data

US 2005/0010659 A1    Jan. 13, 2005

(30) Foreign Application Priority Data

Jul. 8, 2003    (FR) ................................... 03 08306

(51) Int. Cl.
*G06F 15/173* (2006.01)
*G06F 15/177* (2006.01)
*G06F 11/00* (2006.01)

(52) U.S. Cl. ........................... 709/223; 709/220; 714/47
(58) Field of Classification Search ....................... None
See application file for complete search history.

(56) References Cited

U.S. PATENT DOCUMENTS

| | | | |
|---|---|---|---|
| 6,154,776 A * | 11/2000 | Martin | 709/226 |
| 6,167,445 A | 12/2000 | Gai et al. | |
| 6,405,251 B1 * | 6/2002 | Bullard et al. | 709/224 |
| 6,539,425 B1 * | 3/2003 | Stevens et al. | 709/220 |
| 6,549,943 B1 * | 4/2003 | Spring | 709/223 |
| 6,651,191 B1 * | 11/2003 | Vacante et al. | 714/47 |
| 6,901,440 B1 * | 5/2005 | Bimm et al. | 709/223 |
| 6,959,332 B1 * | 10/2005 | Zavalkovsky et al. | 709/223 |
| 6,973,488 B1 * | 12/2005 | Yavatkar et al. | 709/223 |
| 6,983,362 B1 * | 1/2006 | Kidder et al. | 713/1 |
| 2002/0178380 A1 | 11/2002 | Wolf et al. | |
| 2003/0055920 A1 * | 3/2003 | Kakadia et al. | 709/220 |
| 2004/0064558 A1 * | 4/2004 | Miyake | 709/226 |
| 2004/0181476 A1 * | 9/2004 | Smith et al. | 705/35 |

FOREIGN PATENT DOCUMENTS

GB    2 371 646 A    7/2002

\* cited by examiner

*Primary Examiner*—Wen-Tai Lin
(74) *Attorney, Agent, or Firm*—Sughrue Mion, PLLC

(57) ABSTRACT

A system (EMS) is dedicated to the management of network equipments (NE) of a communications network (N) capable of carrying out traffic processing operations associated with services and defined by policy rules delivered in the form of primary data by a policy server (PS). This system (EMS) comprises processing means (MT) interfaced between the policy server (PS) and the network equipments (NE) to allow centralized management of the policy rules and of their institution in the network equipments. The processing means (MT) comprise, for example, conversion means (MC) which, when they receive primary data from the policy server (PS) intended for one of the network equipments (NE), convert the primary data into configuration commands to be sent to the equipment in accordance with its management protocol.

22 Claims, 2 Drawing Sheets

USE OF A COMMUNICATIONS NETWORK ELEMENT MANAGEMENT SYSTEM TO MANAGE NETWORK POLICY RULES

FIELD OF INVENTION

The invention relates to using policy rules to manage communications network equipments (also known as network elements).

BACKGROUND OF THE INVENTION

In the present context the expression "network equipment" means any type of hardware, for example, servers, terminals, switches, routers, or concentrators, capable of exchanging data, in particular management data, with the network management system (NMS) of the network to which it belongs in accordance with a network management protocol. The network management protocol may be the Simple Network Management Protocol (SNMP) of RFC 2571-2580, for example, used in particular in ADSL networks, the TL1 protocol used in particular in SONET networks, the Q3 protocol used in particular in SDH networks, or the CLI and CORBA protocols.

In some communications networks, the network equipments (network elements) are managed as a function of a policy defined by policy rules.

In the present context, the expression "policy rule" means a rule of the type "if <condition> then <action>".

These policy rules define traffic processing operations associated with services that the network equipments must carry out. They are first worked out by the network operator (or supervisor), as a function of the equipments that constitute the network and service level agreements (SLA) entered into with its customers, and are then sent to a policy server belonging to the NMS which validates them.

The network equipments are unable to understand policy rules validated and delivered by the policy server, which must therefore be converted into configuration commands, for example command line interface (CLI) commands.

This kind of conversion depends not only on the type of network equipment but also on the management protocol that it uses for dialogue with the NMS, to be more precise with its element management system (EMS), which serves as its dialogue interface. Because the policy server does not know either the equipment types or their management protocols, it cannot effect the conversions in a centralized manner.

To solve this problem, there is between the management server and each network equipment what is known to the person skilled in the art as a policy enforcement point (PEP). Each PEP is dedicated to converting primary data delivered by the policy server and defining validated policy rules into configuration commands specifically adapted to the management protocol of the associated network equipment.

A specific PEP must therefore be designed for each network equipment and each equipment must be equipped with the associated PEP, which compromises the flexibility of the management architecture based on policy rules and necessitates costly human intervention.

Moreover, conflicts may arise between policy rules instituted in the same network equipment because of the manner in which policy rules are sent out.

It is undoubtedly possible, using a tool such as Orchestream, to display on a screen all of the policy rules that have been instituted in a network equipment, but this type of tool does not provide conjoint access to the configuration parameters of the equipment induced by said rules.

It is also possible, using a tool such as an EMS browser, to display on a screen the configuration parameters of a network equipment induced by the policy rules that it has instituted, but this type of tool does not provide conjoint access to the instituted policy rules.

In other words, the existing tools can only very partially assist operators to diagnose conflicts within the equipments that constitute their networks.

SUMMARY OF THE INVENTION

Thus an object of the invention is to solve some or all of the above-mentioned problems.

To this end it proposes a network equipment management system (EMS) for a communications network comprising a multiplicity of network equipments (also known as elements) adapted to carry out traffic processing operations associated with services and defined by policy rules delivered in the form of primary data by a policy server.

The system EMS is characterized in that it comprises processing means interfaced between the policy server and the network equipments to allow centralized management of the policy rules and their installation in the network equipments.

According to another feature of the invention, the processing means may comprise conversion means adapted, when they receive primary data from the policy server and intended for at least one of the network equipments, to convert the primary data into configuration commands, for example command line interface (CLI) or SNMP commands, in order for them to be sent to the equipment in accordance with its management protocol, in the conventional way.

The conversion means are preferably installed in protocol adaptation means of the EMS adapted, once the management protocol of an equipment has been determined by the conversion means or by the processing means, to adapt configuration commands delivered by the conversion means to the format of this management protocol, in order for them to be sent to the equipment.

The EMS may equally comprise a memory in which descriptors are stored.

A descriptor provides access to an equipment and may also store some or all of the information that is associated with that equipment and defines its state. That information may comprise in particular primary or secondary data that may not be known to the equipment, in particular if the equipment knows only tertiary data. In other words, a descriptor is a module providing access to one aspect of one or more equipments (independently of the equipment), for example its configuration (i.e. its physical or hardware arrangement), at least some of its functions or, thanks to the invention, its policy rules. Thanks to such descriptors, the equipment may be considered under different aspects associated with different descriptors.

The protocol adaptation means preferably comprise protocol adaptation modules which the descriptors selectively access once one of them has determined the management protocol of the destination equipment for the configuration commands.

The descriptors of the processing means may instead or additionally allow access, on command, to any of the network equipments or to a dedicated memory containing information representative of their state, in order to allow management of at least certain policy rules that it has instituted.

For example, this access may be used to extract, on command, secondary data representative of selected policy rules previously instituted in an equipment, either directly in the equipment or in the dedicated memory of the EMS, for example. However, in order to satisfy certain of the policy rules previously received, it also allows extraction, on command, from a network equipment of tertiary data representative of instituted configuration parameters.

If the processing means are adapted to extract secondary data and tertiary data from a network equipment and/or from the dedicated memory, it is advantageous if they also establish a correspondence between the secondary and tertiary data. They may then also comprise analysis means for analyzing each correspondence between secondary and tertiary data in order to deliver analysis data representative of the effect of at least one policy rule on the configuration of a network equipment.

The EMS described hereinabove may be instituted in a management server or in a network equipment.

The invention further relates to a network element management method for use in a communications network comprising a multiplicity of network equipments capable of effecting traffic processing operations associated with services and defined by policy rules delivered by a policy server in the form of primary data.

The method is characterized in that it consists in interfacing an element management system (EMS) between the policy server and the network equipments to allow centralized management of the policy rules and of their installation in the network equipments.

According to another feature of the method, when primary data is received from the policy server that is addressed to at least one of the network equipments, the primary data is converted into configuration commands, for example CLI or SNMP commands, adapted to the management protocol of the equipment and the resulting configuration commands are then sent to the equipment.

Moreover, a designated network equipment and/or a dedicated memory may be accessed to manage certain policy rules that it has instituted. To satisfy certain policy rules previously received, it is possible in this way to extract from a network equipment and/or dedicated memory secondary data representative of selected policy rules previously instituted and/or tertiary data representative of instituted configuration parameters.

Moreover, in the event of double extraction, a correspondence may be established between secondary data and tertiary data associated with a network equipment. Where applicable, the correspondence may then be analyzed to obtain analysis data representative of the effect of at least one policy rule on the configuration of a network equipment.

The invention is particularly well adapted, although not exclusively so, to communications networks such as transmission networks (for example WDM, SONET, SDH networks), data networks (for example Internet-IP or ATM networks), and voice networks (for example standard, mobile or NGN networks).

DESCRIPTION OF THE DRAWINGS

Other features and advantages of the invention will become apparent on examining the following detailed description and the appended drawings, in which.

Figure 1:
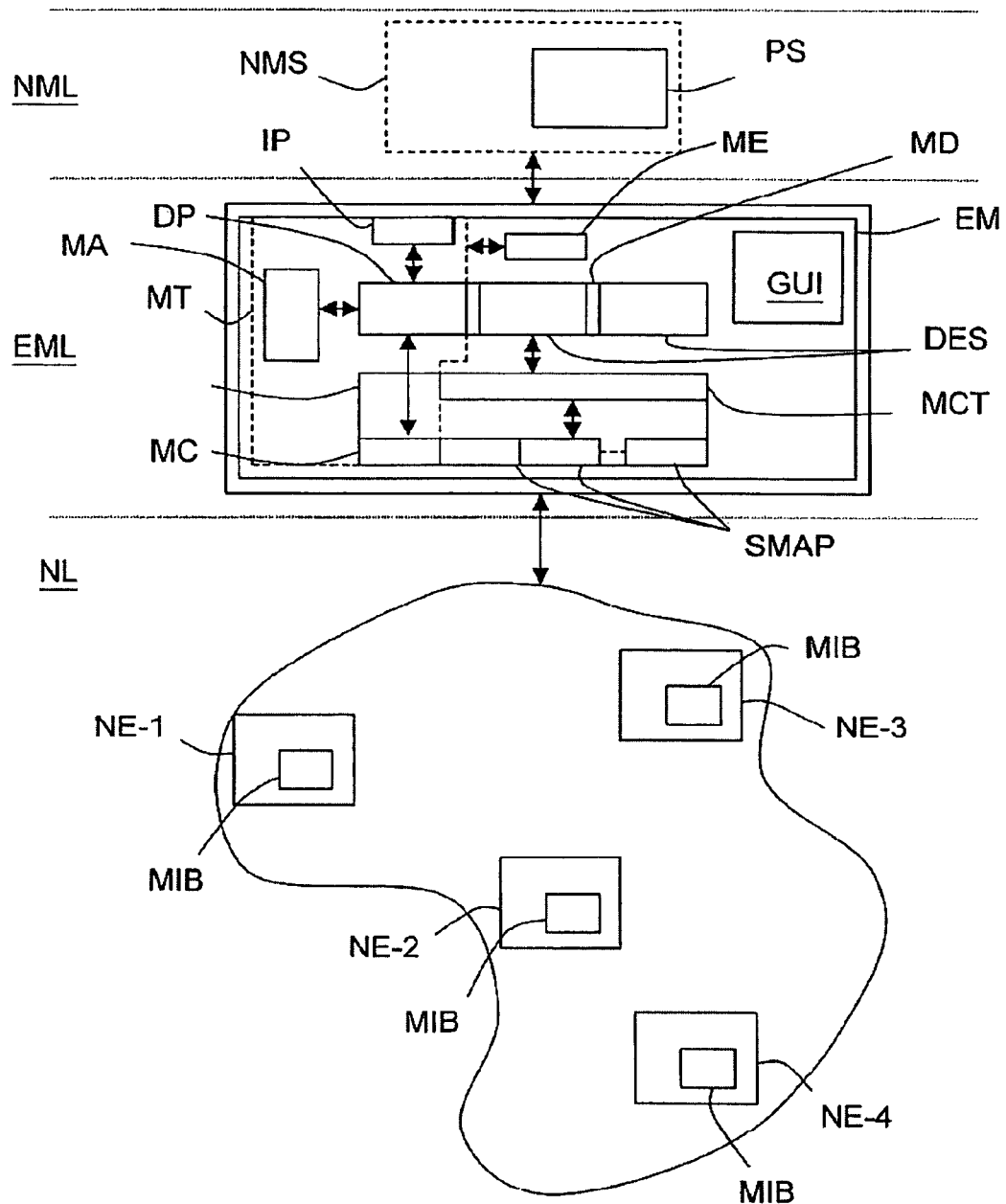
FIG. 1 shows diagrammatically one example of a communications network equipped with an element management system (EMS) according to the invention, installed in a management server.

As well as constituting part of the description of the invention, the appended drawings may, if necessary, contribute to the definition of the invention.

DESCRIPTION OF THE EXEMPLERY EMBODIMENTS OF THE INVENTION

An object of the invention is to provide for synchronized management of network equipments (also known as network elements) of a communications network by an element management system EMS and using policy rules.

By way of illustrative example, the communications network is considered hereinafter to be at least in part of the Internet Protocol (IP) type. However, the invention applies to other types of network, for example WDM, SONET or SDH transmission networks, ATM data networks or standard, mobile or NGN voice networks.

A managed communications network N may be divided into three layers; a first layer is called the network management layer NML, a second layer is called the element management layer EML and the third layer is called the network layer NL.

The third layer NL comprises a multiplicity of network equipments (also known as network elements) NE-i (here i=1 to 4, for example), connected to each other by communications means.

In the present context, the term "network equipment" NE-i means hardware capable of exchanging management data with the management server MS in accordance with a selected management protocol, for example the Simple Network Management Protocol (SNMP) of RFC 2571-2580 or the TL1, CORBA, CLI or Q3 protocols, for example edge or core servers, terminals, switches, routers or concentrators.

The first layer NML comprises a network management system NMS adapted to allow the network manager (or supervisor) to manage and monitor remotely the equipments NE-i connected to it.

The network management system NMS comprises a policy server PS supplied with policy rules by a policy manager controlled by the operator of the network N and installed in the network management system NMS. The policy rules define groups of policies worked out by the operator to satisfy Service Level Agreements (SLA) entered into with customers. They define traffic processing operations that the network equipments NE-i must carry out to implement the services offered by the network N.

The policy server PS validates policy rules that it receives from the policy manager. According to the invention, the validated policy rules are then sent to the second layer EML in the form of primary data.

The second layer EML includes an element management system EMS providing a dialogue interface between the network equipments NE-i and the network management system NMS. Here the element management system EMS is installed in a management server MS connected to the network management system NMS and to the network equipments NE-i. However, it could be installed in a network equipment NE-i such as a terminal dedicated to local equipment management, known as a craft terminal.

The element management system EMS according to the invention manages the policy rules of the network N in addition to its standard functions. In other words, it reproduces completely the architecture and composition of a conventional element management system EMS and comprises in combination processing means MT providing the interface function between the policy server PS and the network equipments NE-i to allow centralized management of the policy rules and their installation in the network equipments NE-i.

In the present context, the expression "standard functions" refers to dialogue between the interfaces of the network (and in particular those of the network equipments) and to managing alarms and events triggered or occurring in the network equipments NE-i. This management of alarms and events enables the network management system NMS to recover information data representative of the operating states of the equipments NE-i and in particular alarms and reports of events occurring in the equipments NE-i to enable management thereof (for example by triggering appropriate actions).

To this end, the element management system EMS comprises a management information tree MIT and a descriptor memory MD in which descriptors DES are stored.

A descriptor is a data processing module that contains all the data necessary for management by the network management system NMS of one aspect of at least one network equipment NE-i.

Any type of aspect may be envisaged, and in particular the configuration (i.e. the physical or hardware arrangement, such as an integrated circuit card or a connection interface, for example), the functions, or the instituted policy rules. A descriptor may also store some or all of the information associated with the equipment and which defines its state, and in particular the exchange (or management) protocol that it uses. These descriptors enable the EMS to access different aspects of an equipment NE-i.

The element management system EMS further comprises a graphical user interface GUI which displays information representative of the network equipments NE-i and may be remotely located in the network management system NMS.

The processing module MT enables the element management system EMS according to the invention to convert policy rules in the form of primary data coming from the policy server PS via a policy interface IP and/or to access the converted policy rules and/or configuration data of the network equipments NE-i that it manages.

An object of the conversion function is to convert primary data from the policy server PS intended for at least one of the network equipments NE-i into configuration commands, for example command line interface (CLI) or SNMP commands that the network equipment NE-i concerned is able to understand (i.e. interpret).

Once the above conversion has been effected, the configuration commands must be converted to the format of the management protocol used by the network equipment NE-i to dialogue with the network management system NMS. As indicated in the introduction, any type of management protocol may be envisaged, and in particular the Simple Network Management Protocol (SNMP) of RFC 2571-2580, used in particular in ADSL networks, the TL1 protocol used in particular in SONET networks, the Q3 protocol used in particular in SDH networks, or the CLI, CORBA and Telnet protocols.

To implement the conversion, the processing means MT comprise a conversion module MC that is preferably installed in the protocol adaptation module MAP of the element management system EMS.

Some element management systems EMS comprise a protocol adaptation module MAP comprising at least as many protocol adaptation sub-modules as there are management protocols used by the equipments NE-i of the network N. This is known in the art.

Each protocol adaptation sub-module SMAP converts, on command, data from the network management system NMS intended for an equipment NE-i into data conforming to the management protocol used by that equipment.

To this end the element management system EMS accesses the descriptor DES stored in the memory MD.

As indicated above, a descriptor DES is a data processing module that contains all the data necessary for management of at least one equipment or element by the network management system NMS. Thus the descriptors constitute, as it were, filters allowing access to a selected aspect of a network equipment NE-i, for example the management (or exchange) protocol that it uses. A descriptor DES is based on an internal object model describing the aspect concerned of the equipment NE-i.

Each descriptor DES generally comprises a first file containing program codes for dialogue with an equipment interface, a second file containing data that designates an equipment type, a third file containing data that designates a definition of a management information base (MIB) associated with the equipment NE-i of the type concerned, and a configuration file, for example an XML file, containing information for managing a network equipment type. The program code files of the descriptors DES are preferably written in Java, because of the ability of Java to load and offload data processing codes dynamically. However, other languages may be envisaged, such as Small Talk, for example, provided that they allow dynamic loading and offloading of data processing codes.

If the element management system EMS wishes to access an aspect of an equipment NE-i, it accesses the descriptor DES stored in the descriptor memory MD and associated with that aspect to determine the management protocol of the equipment NE-i. It deduces from this the corresponding protocol adaptation sub-module SMAP and then sends that protocol adaptation sub-module SMAP the data to be converted in accordance with the management (or exchange) protocol used by the equipment NE-i.

By installing the conversion module MC in the protocol adaptation module MAP, the invention exploits with advantage the ability of the protocol adaptation sub-module SMAP, in conjunction with the descriptors DES, to convert configuration commands delivered to it to the format of the management protocol of the network equipment NE-i concerned.

Accordingly, when the conversion module MC receives primary data intended for a network equipment NE-i and to be converted, it converts the data into configuration commands, for example CLI or SNMP commands, and then requests the control module MCT of its protocol adaptation module MAP, for example, to determine the management protocol used by the designated equipment NE-i. The control module MCT of the protocol adaptation module MAP then interrogates the descriptor memory MD to determine the management protocol associated with the designated equipment NE-i and thus the associated protocol adaptation sub-module SMAP. The conversion module MC then sends the configuration commands to this protocol adaptation sub-module SMAP in order for it to convert them to the format of the management protocol of the equipment, after which it sends them in the standard manner.

The processing module MT may instead determine the management protocol associated with the designated equipment NE-i and therefore the associated protocol adaptation sub-module SMAP directly in the descriptors memory MD, to communicate to the conversion module MC the primary data to be converted into configuration commands and the designation of the protocol adaptation sub-module SMAP for converting the configuration commands to the format of the management protocol of the equipment NE-i concerned.

As indicated above, the processing module MT of the element management system EMS may instead or additionally provide access to the converted policy rules and/or to the configuration data of the network equipments NE-i that it manages.

The processing means MT may instead or additionally comprise a filter module DP for accessing, on the instructions of the network management system NMS, any of the network equipments NE-i and/or a dedicated memory ME installed in the EMS, for example, storing the states of the equipments NE-i, to enable management of at least some of the policy rules that it has instituted.

A state may be described by a Boolean (true/false) operator, for example. This is the case of a state indicating whether an interface is on or off, for example.

The filter module DP is preferably a policy descriptor instituted in the descriptor memory MD and preferably of the same type as those described above. Only its function is different. It is based on a data module describing policy rule formalisms or identifiers.

The data module defines how the rules are formulated. A rule is written "if <condition> then <action>".

In order to satisfy some of the policy rules previously received, the policy descriptor DP enables extraction of secondary data representative of selected policy rules previously instituted and tertiary data representative of instituted configuration parameters from the network equipment NE-i and/or from the dedicated memory ME on the instructions of the network management system NMS.

The secondary data consists in fact of the configuration commands sent to the network equipment NE-i. The secondary data is sent to the network equipment NE-i but is preferably stored in the dedicated memory ME by the protocol descriptor DP. It constitutes configuration instructions and not parameters as such.

The tertiary data consists of the configuration (or operating) parameters that the equipment has instituted to implement traffic processing operations defined by the configuration commands received. The tertiary data is preferably stored in the management information base MIB of the equipment NE-i. It may be retrieved by using the descriptor to interrogate the equipment.

Old configuration commands and/or old configuration parameters are preferably stored in the dedicated memory ME and/or in the equipment NE-i for a selected time period.

The configuration commands (or policy rules) and/or the configuration parameters may be displayed on a screen of the EMS or the NMS via the graphical user interface GUI in order for the network operator to be able to analyze them.

For example, the operator may request the filter module DP to send it the configuration commands currently instituted and the configuration commands previously instituted in order to analyze the influence of the modification of the configuration commands on the services provided or traffic processing operations effected.

Figure 2:
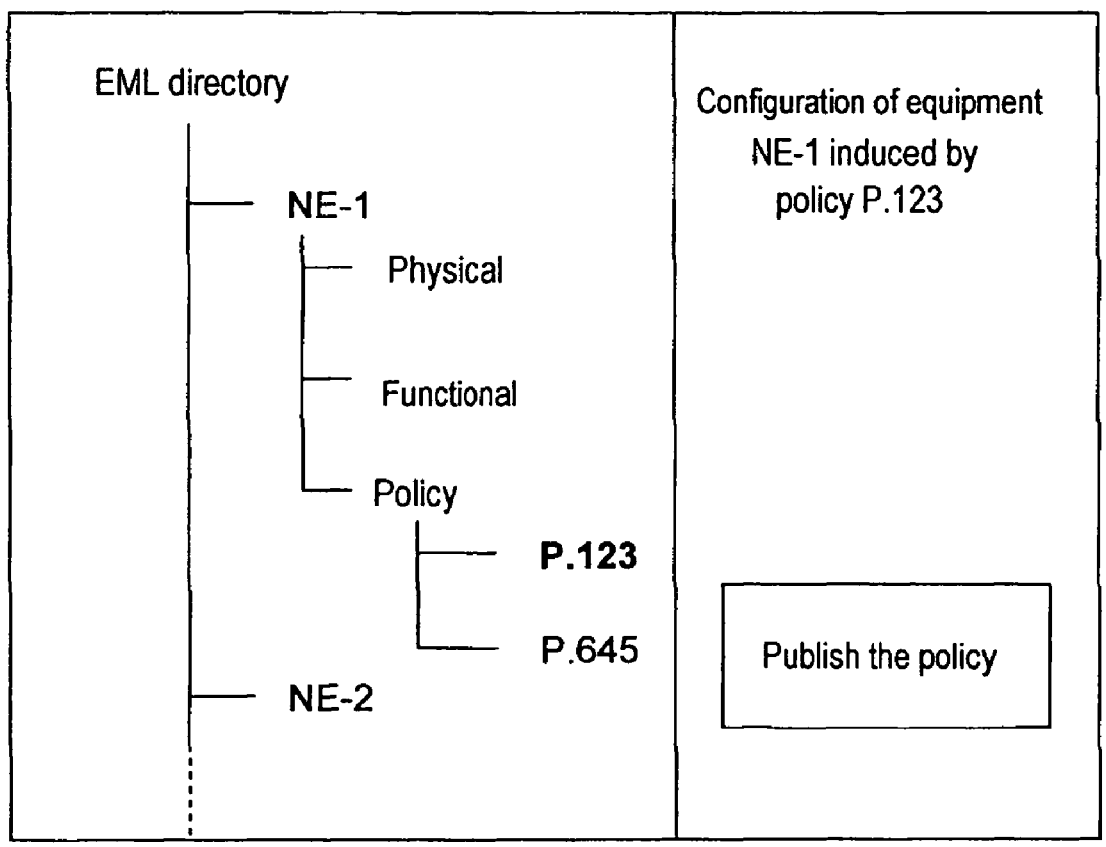
FIG. 2 shows diagrammatically one example of a display screen showing a portion of a tree of network equipments in corresponding relationship to an information window.

As shown in FIG. 2, the operator may also request the filter module DP to send it the configuration parameters (tertiary data) of an equipment (for example the equipment NE-1) induced by instituting the policy rules defining one of the policies instituted in the equipment NE-1 (for example policy P.123) and the configuration commands (secondary data) defining the policy P.123. For example, the operator can therefore view in a window on the left-hand side of his display screen the tree of the network equipments NE-i managed by his element management system EMS, the sub-tree of functions available for a particular network equipment (here the network equipment NE-1), and the sub-sub-tree of the policies instituted in that equipment, and in a window on the right-hand side of the screen configuration parameters induced by instituting the selected policy (here policy P.123) and the configuration commands defining the selected policy P.123 in the network equipment NE-1.

The operator can therefore verify the influence of a policy on the configuration of a network equipment NE-i and therefore on the traffic processing effected by that equipment. This enables it to understand the behavior of the equipment and to diagnose a conflict between policies or between policy rules that is the cause of a problem such as traffic blocking, and may also enable the operator to determine the causes of a conflict in the context of simulated operation.

The processing means MT may equally comprise an analysis module MA connected to the filter module DP for analyzing each correspondence between secondary data and tertiary data in order to deliver, via the graphical user interface GUI, analysis data representative of the effect of at least one policy rule on the configuration of a network equipment NE-i. An analysis module MA of this kind then provides a diagnostic tool that may be able to offer the operator conflict resolution solutions.

Moreover, the filter module DP may equally be adapted to enable the operator to modify policy rules or configuration commands in conjunction with the conversion module MC and under certain strict conditions.

The element management system EMS, and in particular its processing module MT, preferably takes the form of software or data processing modules, i.e. configuration files, for example XML files, and program code files, for example Java files, to enable it to be installed in any type of network equipment NE-i, including a communications terminal such as a notebook computer. However, it can of course take the form of a combination of electronic circuits (hardware) and software modules.

The element management system EMS of the invention, and in particular its processing module MT, may take the form of electronic circuits (hardware), data processing modules (software) or a combination of hardware and software.

The invention also provides a method of managing network equipments NE-i for a communications network N comprising a multiplicity of network equipments NE-i capable of carrying out traffic processing operations associated with services and defined by policy rules in the form of primary data delivered by a policy server PS.

This method may in particular be implemented with the aid of the element management system EMS described hereinabove. The main and optional functions and sub-functions of the steps of the method being substantially identical to those of the means constituting the element management system EMS, only the steps implementing the main functions of the method of the invention are outlined hereinafter.

The method consists in interfacing an element management system EMS between the policy server PS and the network equipments NE-i in order to allow centralized management of policy rules and their installation in the network equipments NE-i.

For example, when primary data intended for at least one of the network equipments NE-i is received from the policy server PS, the primary data may be converted into configuration commands, for example CLI or SNMP commands, adapted to the management protocol of the equipment and which are then sent to the equipment.

Filtering may instead or additionally provide access to a designated network equipment NE-i and/or to a dedicated memory ME storing its state when it requires to manage certain policy rules that it has instituted. To satisfy certain policy rules previously received, it is therefore possible to extract from a network equipment NE-i and/or the dedicated memory ME secondary data representative of selected policy rules previously instituted and/or tertiary data representative of instituted configuration parameters.

The invention is not limited to the embodiments of the element management system EMS, management server MS and management method described hereinabove by way of example only, but encompasses all variants within the scope of the following claims that the person skilled in the art might envisage.

The invention claimed is:

1. A network equipment management system for a communications network comprising network equipment units carrying out traffic processing operations associated with services and defined by policy rules delivered in a form of primary data by a policy server; the network equipment management system comprising:
   processing module interfaced between said policy server and said network equipment units allowing centralized management of said policy rules and installation of the policy rules in said network equipment units;
   protocol adaptation module having a conversion module which, on receiving primary data from said policy server intended for at least one designated network equipment unit, converts said primary data into configuration commands to be sent to said designated equipment unit in accordance with management protocol of the designated equipment unit; and
   a memory which stores descriptors each associated with one aspect of at least one of said network equipment units and said memory comprising for at least some of the descriptors management protocols used by said network equipment units,
   wherein said protocol adaptation module determines in said memory the management protocol used by the at least one designated network equipment unit to which configuration commands are sent,
   wherein, the protocol adaptation module converts said policy rules from the policy server into the configuration command specific to the designated equipment unit based on a management protocol used by said designated equipment unit as determined by the processing module,
   wherein the policy server validates the policy rules received from a policy manager and sends the validated policy rules to a layer that includes an element management system providing a dialogue interface between the network equipment units and a network management system.

2. The system according to claim 1, wherein said processing module determines in said memory the management protocol used by an equipment unit to which configuration commands are sent.

3. The system according to claim 1, wherein said protocol adaptation module, once in possession of the management protocol of an equipment unit modifies configuration commands delivered by said conversion module to the format of said management protocol for configuration commands to be sent to said equipment unit.

4. The system according to claim 1, wherein said configuration commands are selected from a group comprising Command Line Interface (CLI) commands and Simple Network Management Prototcol (SNMP) commands.

5. The system according to claim 1, wherein said processing module comprise a filter, on command, accesses one of said network equipment units and/or a dedicated memory to enable management of selected policy rules.

6. The system according to claim 5, wherein said processing module comprises the filter which, on command, extracts from a network equipment unit and/or from said dedicated memory secondary data representative of selected policy rules previously instituted.

7. The system according to claim 6, wherein, to satisfy at least some of said policy rules previously received, the filter, on command, extracts from a network equipment unit tertiary data representative of configuration parameters instituted by said equipment unit.

8. The system according to claim 6, wherein, to satisfy at least some of said policy rules previously received, the filter, on command, extracts from a network equipment unit tertiary data representative of configuration parameters instituted by said equipment unit, and, wherein said filter establishes a correspondence between the secondary and tertiary data associated with a network equipment unit.

9. The system according to claim 8, wherein the processing module comprises analysis sub-module which analyzes a correspondence between the secondary and tertiary data to provide analysis data representative of the effect of at least one policy rule on the configuration of a network equipment unit.

10. The system according to claim 5, wherein the processing module comprises a memory which stores descriptors each associated with one aspect of at least one of said equipment units and said processing module comprising for at least some of the descriptors, management protocols used by said equipment units, and wherein said filter is installed in said memory.

11. A management server of a network management system comprises the network equipment management system according to claim 1.

12. A network equipment comprises the network equipment management system according to claim 1.

13. The equipment management system according to claim 1 is deployed in at least one of transmission networks, WDM, SONET and SDH networks, data networks, in particular Internet-IP and ATM networks, and voice networks, in particular standard, mobile, and NGN networks.

14. The system according to claim 1, wherein the processing module centrally manages the policy rules previously instituted in the network equipment units.

15. The system according to claim 1, wherein the descriptors define a state of the network equipment units.

16. The system according to claim 1, wherein the descriptor provides access to one aspect of one or more equipment units independently of the equipment units.

17. A network equipment management system for a communications network comprising network equipment units carrying out traffic processing operations associated with services and defined by policy rules delivered in a form of primary data by a policy server; the network equipment management system comprising:
   processing module interfaced between said policy server and said network equipment units allowing centralized management of said policy rules and installation of the policy rules in said network equipment units; and
   protocol adaptation module having a conversion module which, on receiving primary data from said policy server intended for at least one designated network equipment unit, converts said primary data into configuration commands to be sent to said designated equipment unit in accordance with management protocol of the designated equipment unit; and a memory which stores descriptors each associated with one aspect of at least one of said equipment units and comprising for at least some of the descriptors, the management protocols used by said equipment units, wherein the descriptor comprises:

a first file containing program codes for dialogue with a network equipment interface;

a second file containing data that designates a network equipment type;

a third file containing data that designates a definition of a management information base associated with the network equipment units; and a configuration file containing information for managing the network equipment type.

18. The system according to claim 1, wherein the equipment management system receives the policy rules from a policy server and provide the policy rules to all equipment units in the communications network.

19. The system according to claim 5, wherein the selected policy rules that are instituted on the equipment unit.

20. The system according to claim 1, further comprising:

a memory which stores a file containing data that designates a definition of a management information base associated with the network equipment units.

21. The system according to claim 1, wherein the element management system accesses descriptors stored in a descriptor memory and determines a management protocol of the equipment, and wherein the element management system deduces from the determined management protocol a corresponding protocol adaptation sub-module and sends the protocol adaptation sub-module data to be converted in accordance with the management protocol used by the equipment.

22. The system according to claim 1, wherein the configuration commands are sent to said designated equipment unit.

* * * * *